(12) United States Patent
Bongaards et al.

(10) Patent No.: US 6,357,248 B1
(45) Date of Patent: Mar. 19, 2002

(54) COMPACT TRANSPORT TEMPERATURE CONTROL UNIT

(75) Inventors: Donald J. Bongaards, Shorewood, MN (US); Michal Kolda, Prague (CZ); Petr Prochazka, Prague (CZ); Jiri Ota, Prague (CZ); Vladamir Sulc, St. Paul, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/704,121

(22) Filed: Nov. 1, 2000

Related U.S. Application Data

(63) Continuation-in-part of application No. 09/300,997, filed on Apr. 28, 1999, now abandoned.

(51) Int. Cl.[7] .............................................. F25D 23/12
(52) U.S. Cl. .............................. 62/263; 62/239; 62/243; 62/323.3
(58) Field of Search .................... 62/239, 263, 243, 62/323.3

(56) References Cited

U.S. PATENT DOCUMENTS

| | | | | |
|---|---|---|---|---|
| 3,699,870 A | * | 10/1972 | Cantagallo et al. | 98/10 |
| 3,733,849 A | * | 5/1973 | Cantagallo et al. | 62/414 |
| 3,894,405 A | * | 7/1975 | Mielitz | 62/241 |
| 4,712,383 A | * | 12/1987 | Howland et al. | 62/200 |
| 5,187,950 A | * | 2/1993 | Weldon | 62/449 |
| 5,609,037 A | * | 3/1997 | Fischler | 62/239 |
| 5,878,592 A | * | 3/1999 | Borges et al. | 62/285 |
| 5,916,253 A | * | 6/1999 | Amr et al. | 62/259.1 |
| 5,960,637 A | * | 10/1999 | Stevens et al. | 62/77 |
| 6,223,546 B1 | * | 5/2001 | Chopko et al. | 62/243 |

* cited by examiner

Primary Examiner—William Doerrler
Assistant Examiner—Mark Shulman
(74) Attorney, Agent, or Firm—Michael Best & Friedrich LLP

(57) ABSTRACT

A compact transport temperature control unit includes an electrically-powered condenser assembly, an electrically-powered evaporator assembly and an electrically-powered compressor. The electrical power is supplied from a source external to the transport temperature control unit.

26 Claims, 10 Drawing Sheets

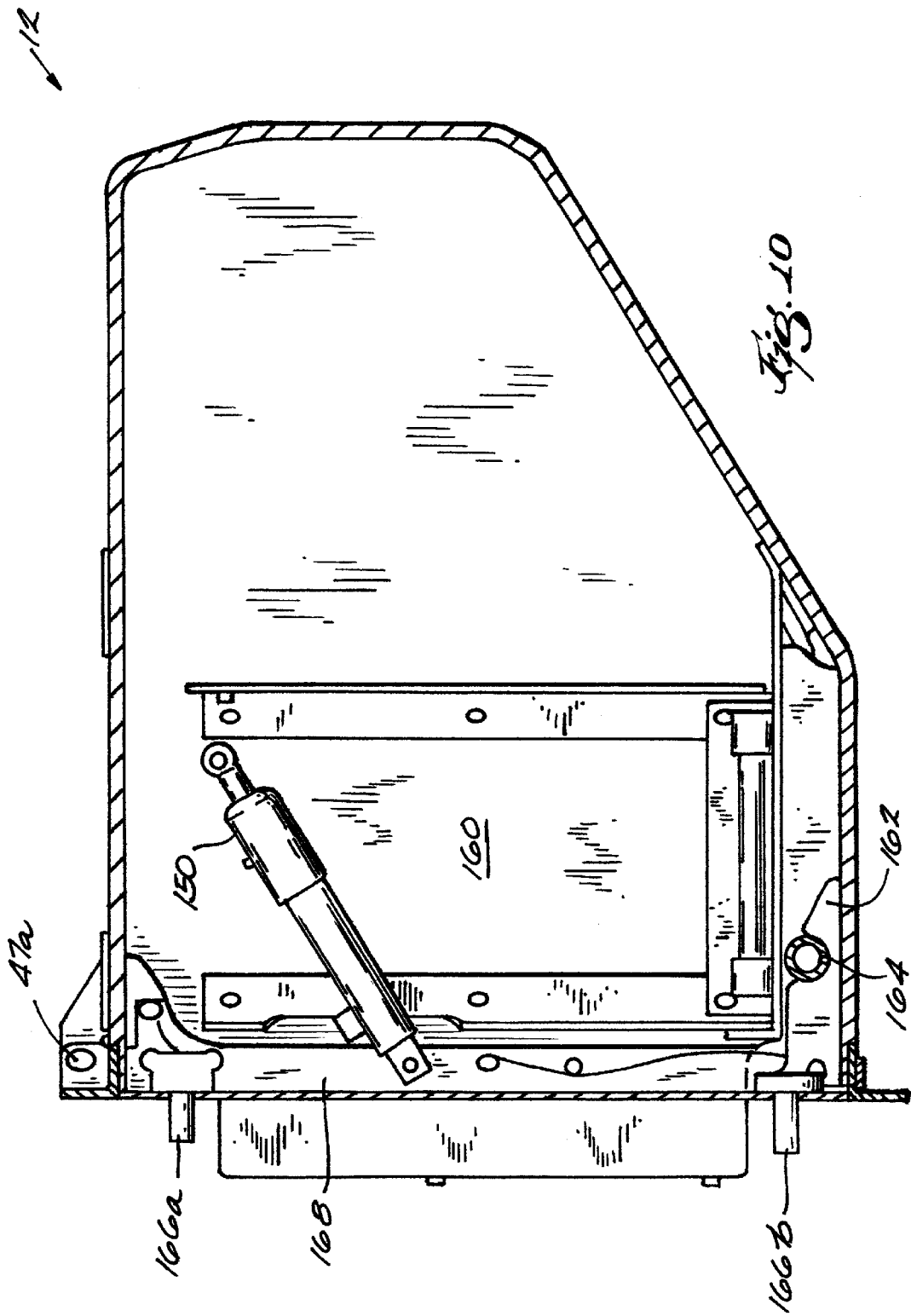

COMPACT TRANSPORT TEMPERATURE CONTROL UNIT

RELATED APPLICATION

This application is a continuation-in-part of U.S. application Ser. No. 09/300,997 filed Apr. 28, 1999. This is abandoned.

BACKGROUND

Transport temperature control units are used to maintain a desired temperature in a conditioned space inside an enclosure used for carrying cargo, such as in a trailer, truck or other transport container. Transport temperature control units generally include an evaporator assembly that transfers heat from the conditioned space to a refrigerant, and a condenser assembly that transfers heat from the refrigerant to the outside environment. The evaporator assembly typically includes an evaporator coil and air-moving apparatus. The air-moving apparatus draws relatively warm air from the conditioned space, moves the air through the evaporator coils, which extract heat from the air. The air-moving apparatus also returns the cooler air to the conditioned space. Similarly, the condenser assembly typically includes condenser coils and air-moving apparatus. The air-moving apparatus draws air from the outside environment through the condenser coils, which discharge heat into the air, and returns the heated air to the outside environment. Transport temperature control units also generally include a refrigerant compressor to compress the refrigerant and an expansion valve to decompress the refrigerant. The evaporator assembly, condenser assembly, compressor and other components in the temperature control unit require a power supply. Conventional transport temperature control units employ an engine, such as an internal combustion diesel engine, to supply the needed power.

A transport temperature control unit can be installed on the exterior of the enclosure, outside of the conditioned space. In the case of a truck, a typical mounting site for the transport temperature control unit is at the front of the enclosure, above the cab of the truck. In such a case usually there may be limited space for the transport temperature control unit. When the truck has a tilt cab, i.e., access to the truck engine is provided by swinging the body of the cab forward and away from the chassis, the space for a transport temperature control unit is even more limited. If the transport temperature control unit impinges upon the cab body's swing radius, then the cab body may not be able to swing forward because the transport temperature control unit is in the way, or the transport temperature control unit may be damaged by the cab body as the cab body is swung.

To save space, part of the temperature control unit may be located wholly or partially inside the conditioned space of the container. Frequently the evaporator is placed largely or entirely within the conditioned space. It is generally undesirable, however, to locate the evaporator in the conditioned space, for several reasons. For example, an evaporator in the conditioned space takes up room that could be used to carry cargo. In addition, the evaporator could be easily damaged as cargo is moved about inside the conditioned space, by contact with the machinery used to move the cargo or by contact with the cargo itself.

SUMMARY

The invention relates to a compact arrangement of the condenser and evaporator on a temperature controlled transportation unit. In one aspect, the invention presents a transport temperature control unit adapted to maintain a conditioned space at a desired temperature. The unit includes an electrically-powered condenser assembly and an electrically-powered evaporator assembly flow connected to the condenser assembly. The evaporator assembly adapted to be located outside the conditioned space, and the electrical power is supplied from a source external to the transport temperature control unit.

In one embodiment, the unit may be fixedly mounted to a cargo container. In another embodiment, the unit may be mounted to the cargo container so as to allow the unit to swing upward, thus providing clearance for a tilt-cab truck with a large swing radius.

In a another embodiment, the invention presents a temperature-controlled transport system. The system includes an enclosure for holding cargo and a compact transport temperature control unit.

In a further embodiment, the transport temperature control unit may include two evaporator sub-assemblies. The sub-assemblies may be flow connected in parallel, allowing a single unit to provide independent temperature regulation to two compartments.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10 is a cutaway view of a transport temperature control unit taken along 10—10 in FIG. 3.

Like reference symbols in the various drawings indicate like elements.

DETAILED DESCRIPTION

Figure 1:
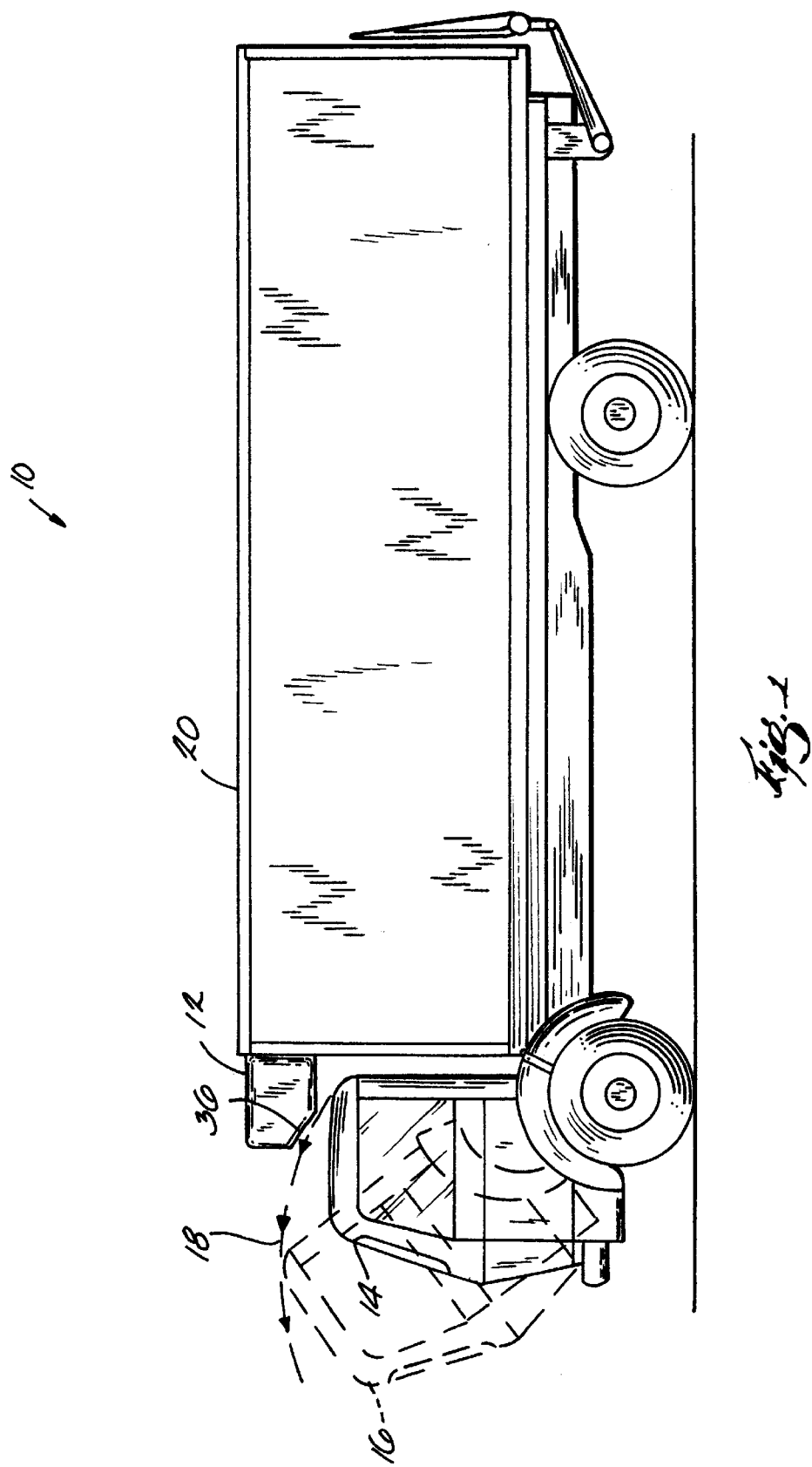
FIG. 1 is a side view of a tilt cab truck.

FIG. 1 shows a side view of a truck 10 with a tilt cab 14. Cab 14 swings forward 16 to allow access to the engine of truck 10. In swinging forward, cab 14 defines a swing radius 1 8, which bounds the space needed to swing cab 14 forward. A fixed object with a profile that intersects swing radius 18 impinges on swing radius 18, and may prevent cab 14 from being swung forward. Similarly, a fixed object impinging on swing radius 18 may also be damaged if struck by cab 14 as the cab swings forward.

Truck 10 also includes a cargo container 20. In truck 10 shown in FIG. 1, cargo container 20 is coupled to the body of truck 10. Cargo container 20 encloses a conditioned space that holds the cargo. A transport temperature control unit 12 has been mounted on the front of cargo container 20. Transport temperature control unit 12 maintains a conditioned space at a desired temperature, thus keeping the enclosed cargo at a desired temperature.

The profile of transport temperature control unit 12 shown in FIG. 1 does not impinge upon swing radius 18 of cab 14. Transport temperature control unit 12 is compact, allowing cab 14 to be swung forward without touching transport temperature control unit 12. In addition, transport temperature control unit 12 includes a portion of its underside angled 36, to allow cab 14 to swing forward freely. The assembly of transport temperature control unit 12 and the compact arrangement of the unit's components will be described in more detail below.

Figure 2:
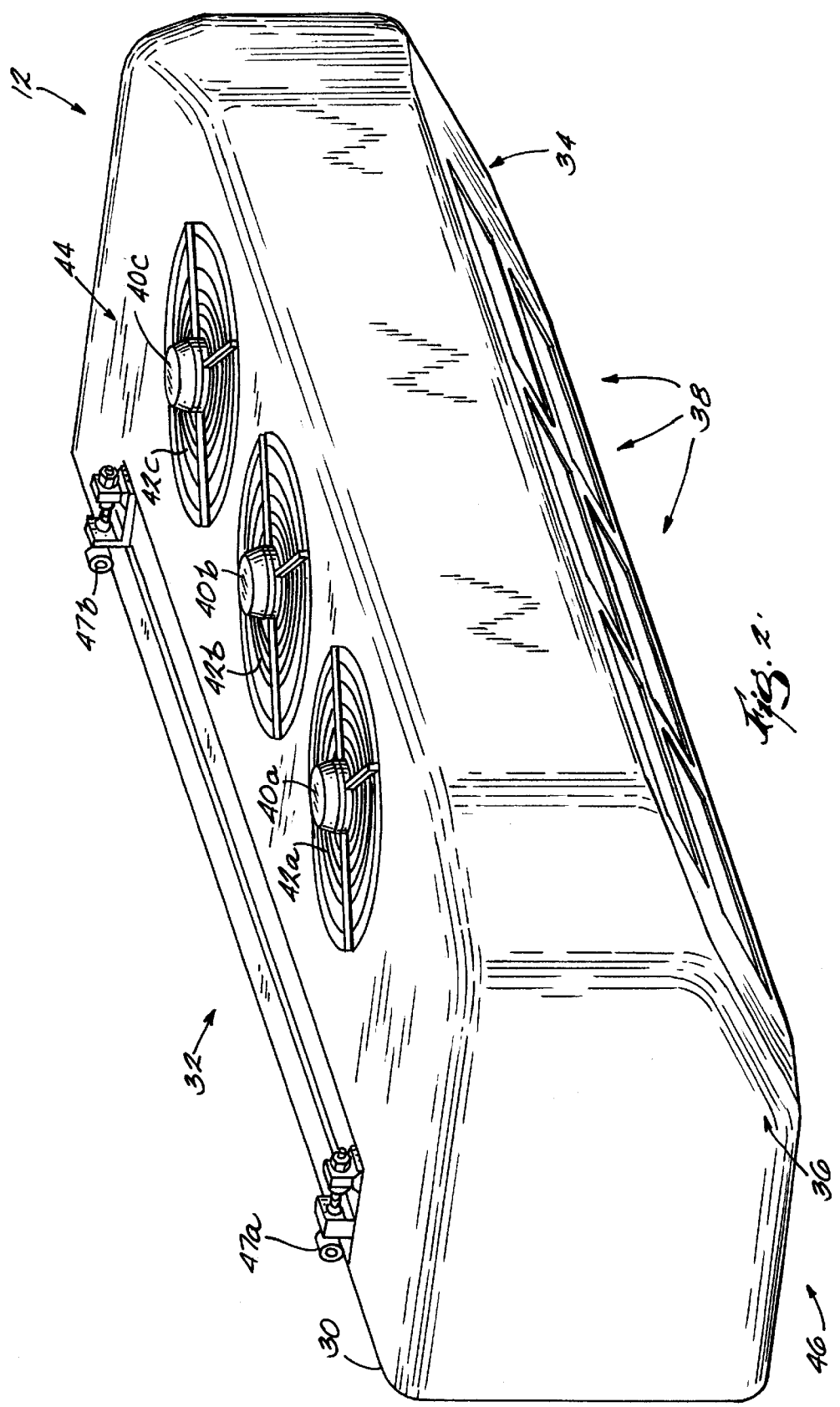
FIG. 2 is a perspective view of a transport temperature control unit, including the top, front and right sides.

FIG. 2 shows a perspective view of transport temperature control unit 12. For simplicity transport temperature control unit 12 is not shown in FIG. 2 as mounted to cargo container 20. Transport temperature control unit 12 includes a front side 34, which when mounted would face toward the front of truck 10, and a rear side 32. Transport temperature control unit 12 includes a housing or cover 30, which covers many of the components of the unit. Cover 30 protects the components of transport temperature control unit 12 from the elements, adds aerodynamic streamlining to the unit, and improves the unit's appearance.

Underside 46 of transport temperature control unit 12 includes an angled underside portion 36, as shown in FIG. 2. The section of cover 30 covering angled underside portion 36 defines several apertures 38. These apertures 38 serve as air intakes for a condenser assembly 68, which is shown in more detail in FIG. 4. Top 44 of the transport temperature control unit 12 includes condenser fans 40a, 40b and 40c. Three condenser fans 40a, 40b and 40c are shown. Each of condenser fans 40a, 40b and 40c is electrically powered and is individually and independently controllable, i.e., the fans do not need to be driven by an external mover such as a separate electric motor. Consequently condenser fans 40a, 40b and 40c are compact and do not require additional space for an external mover, nor do the fans require additional space or for any apparatus connecting the fans to an external mover. Condenser fans 40a, 40b and 40c each draw air into transport temperature control unit 12 from the environment through apertures 38 on angled underside portion 36, and also discharge the air to the environment though openings 42a, 42b and 42c on top 44 of the unit. Air drawn into transport temperature control unit 12 through apertures 38 receives heat from refrigerant circulating through the unit's condenser assembly 68. When the heated air is discharged through openings 42a, 42b and 42c, the heat is carried away from transport temperature control unit 12.

FIG. 2 further shows hinge mounts 47a and 47b, which may be used for mounting transport temperature control unit 12 in a hinged fashion as will be described in more detail below.

Figure 3:
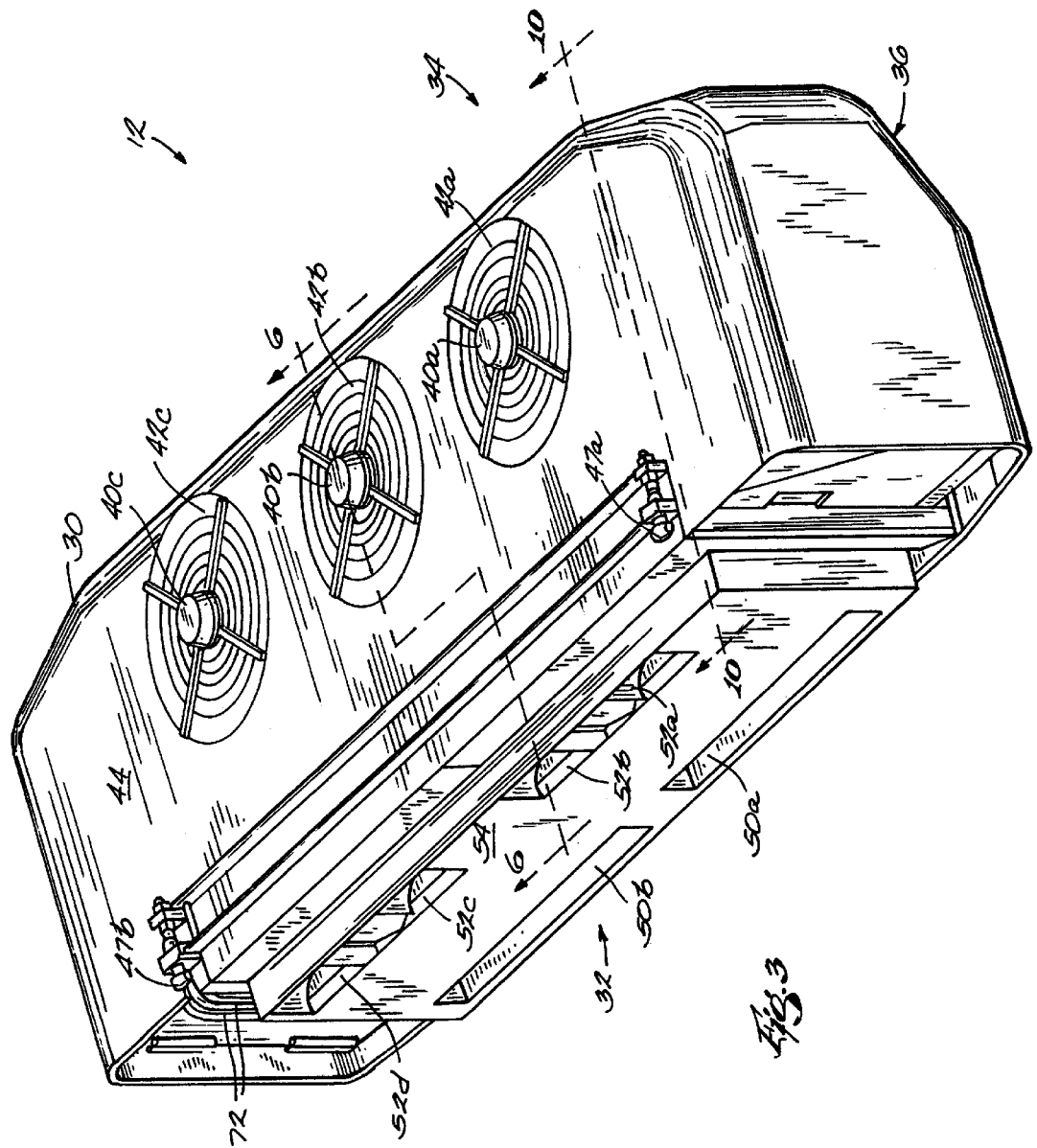
FIG. 3 is a perspective view of a transport temperature control unit, including the top, rear and right sides.
Figure 5:
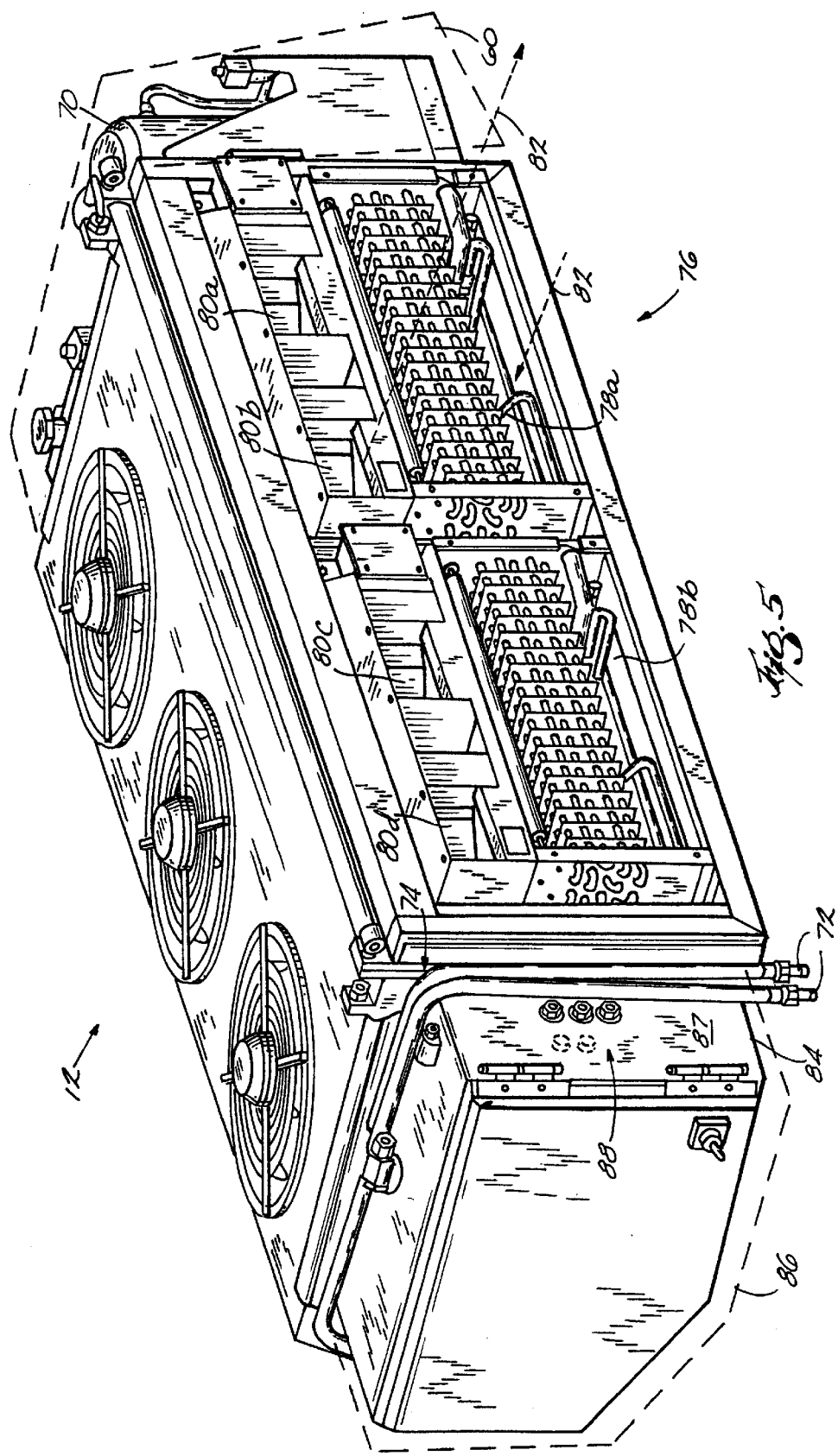
FIG. 5 is a perspective view of a transport temperature control unit with the cover removed.

FIG. 3 provides a different view of transport temperature control unit 12 with cover 30 in place. In FIG. 3, rear side 32 is visible. The rearmost portion of transport temperature control unit 12 may include a covered rear protrusion or bezel 54, which is intended to mate with an opening in the insulated front wall of cargo container 20, and which extends through the insulated wall toward the conditioned space. When transport temperature control unit 12 is mounted on cargo container 20, bezel 54 becomes nearly flush with the interior walls of cargo container 20. Transport temperature control unit 12 therefore does not consume the conditioned space used to store cargo. An evaporator assembly 76, which is shown in more detail in FIG. 5, is located outside the conditioned space. There are advantages to locating evaporator assembly 76 outside the conditioned space. Such an arrangement makes more of the conditioned space available for cargo and also protects evaporator assembly 76 from accidental damage caused by contact with cargo or loading equipment.

Rear side 32 of transport temperature control unit 12 includes evaporator air intakes 50a and 50b. Two such air intakes 50a and 50b are shown in FIG. 3. Air drawn through intakes 50a and 50b gives up heat to the refrigerant circulating in evaporator assembly 76. Air drawn from the conditioned space into transport temperature control unit 12 through intakes 50a and 50b is discharged back into the conditioned space as cooler air through outlets 52a, 52b, 52c and 52d. Advantageously transport temperature control unit 12 draws air centrally from and discharges air centrally into the conditioned space, and extends across nearly the full width of cargo container 20. Such central positioning, combined with air discharge near the top of container 20, provides good air circulation around the load, and permits increased loading of cargo in the conditioned space.

Rear side 32 of transport temperature control unit 12 further includes connective tubing 72, which supplies coolant from the engine of truck 10 to transport temperature control unit 12.

Figure 4:
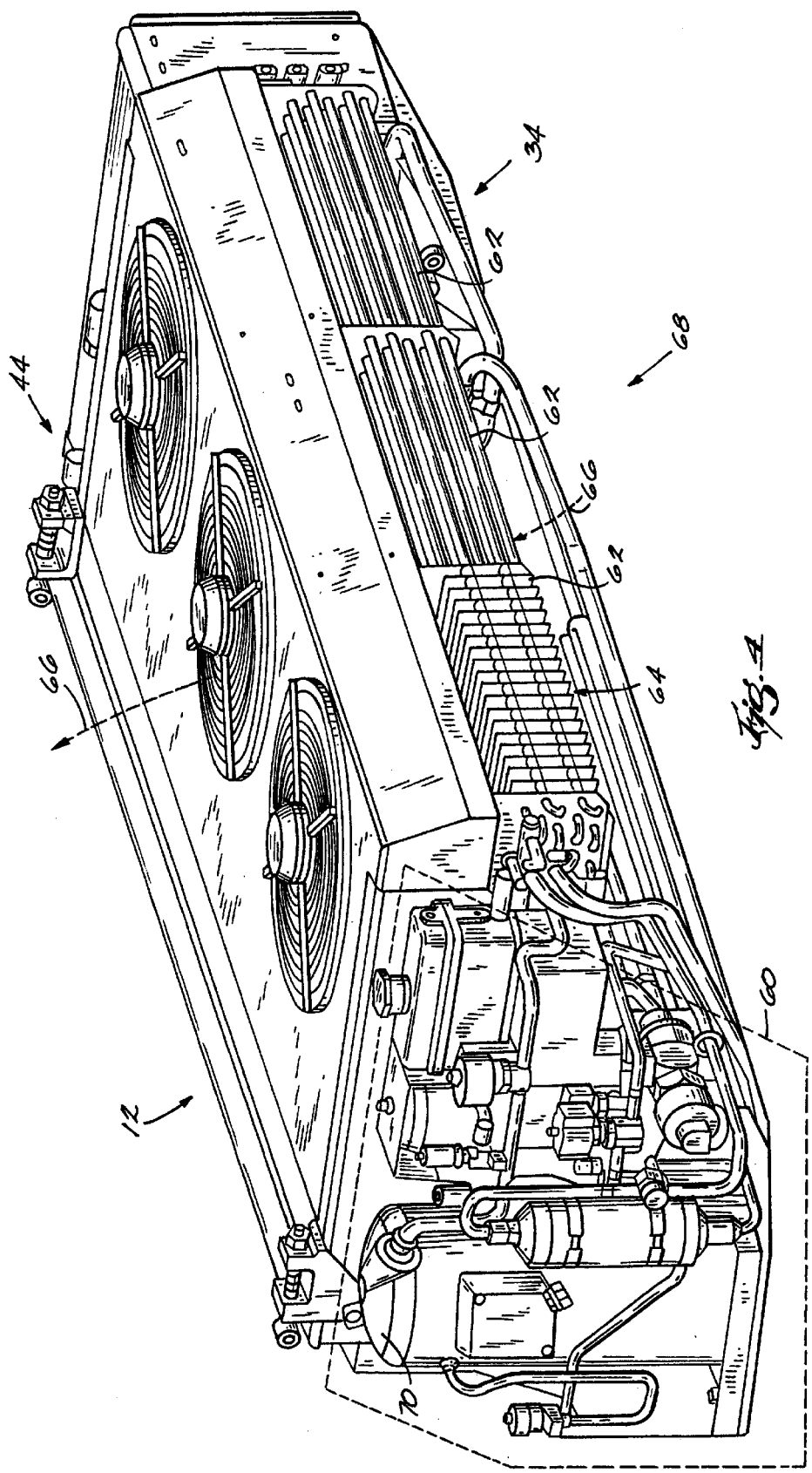
FIG. 4 is a perspective view of a transport temperature control unit with the cover removed.

FIG. 4 provides a perspective view of transport temperature control unit 12 with cover 30 removed. Near front 34 of the transport temperature control unit 12 is a condenser assembly 68, which includes condenser coils 62. Typically condenser coils 62 include fins 64, but some fins have been removed to illustrate the horizontal orientation of condenser coils 62. An exemplary air path 66 illustrates air drawn in from the environment from beneath unit 12. The air drawn through apertures 38 moves upward through horizontal condenser coils 62, and continues upward where the air is discharged into the environment. Condenser assembly 68 spans most of the width of transport temperature control unit 12, allowing an extended surface area for condenser coils 62. The extended surface area facilitates efficient heat exchange, by which heat is transferred from the refrigerant to the air.

Removal of cover 30 allows access to a refrigeration and cooling system 60. A component of refrigeration and cooling system 60 that plays an important role in the refrigeration process is a compressor 70. Compressor 70 is a hermetic scroll compressor such as a Copeland ZF18, sealed from the elements and driven by the compressor's own internal electric motor. Compressor 70 notably does not need to be driven by mechanical energy supplied by another mover, such as an external motor. Consequently, compressor 70 is itself compact and does not require additional space for a mover. In addition to compressor 70, refrigeration and cooling system 60 includes apparatus to provide refrigeration, such as a dryer, receiver tank and other apparatus to compress, move and otherwise process the refrigerant.

Refrigeration and cooling system 60 may further include cooling apparatus. Coolant, circulating in a loop separate from the refrigerant, may be used to cool components external to transport temperature control unit 12, and may discharge its heat in or near condenser assembly 68. Connective tubing 72, shown in FIGS. 3 and 5, is a part of the coolant loop. An exemplary component that may be cooled in this fashion is the supplier of electric power to unit 12. A supplier such as an alternator may be located remotely from unit 12, such as in the engine compartment of cab 14. Transport temperature control unit 12, therefore, may supply coolant to the power supplier, as the power supplier supplies electrical power to unit 12.

Some of the components in refrigeration and cooling system 60, such as the receiver tank, require no power to operate. The components requiring power, such as compressor 70 in the refrigeration system and solenoid valves in the cooling system, are electrically powered. None of these components is mechanically powered by a mover such as an external motor. Refrigeration and cooling system 60 does not require a diesel motor or a generator or other supplier of mechanical or electric power to be included in the system. Electric power may be supplied from a source external to transport temperature control unit 12.

FIG. 5 provides another perspective view of transport temperature control unit 12 with cover 30 removed. Near rear side 32 of transport temperature control unit 12 is evaporator assembly 76, which includes evaporator coils 78a, 78b. Evaporator coils 78a, 78b are arranged in a horizontal fashion and span most of the width of unit 12, allowing an extended surface area for evaporator coils 78a and 78b. As shown in FIG. 5, evaporator coils 78a have an associated set of two blowers 80a and 80b, and evaporator coils 78b have an associated set of two blowers 80c and 80d. Each of the blowers 80a, 80b, 80c and 80d is electrically powered and is individually and independently controllable. Blowers 80a, 80b, 80c and 80d do not require an external mover, and consequently do not need additional space for an external mover or for any apparatus connecting the blowers to an external mover.

An exemplary air path 82 illustrates air drawn in from the conditioned space through air intake 50a moving through horizontal evaporator coils 78a. The air is subsequently directed by blower 80b through outlet 52b and is discharged into the conditioned space. The other blowers 80a, 80c and 80d similarly draw air from the conditioned space through evaporator coils 78a and 78b and discharges the air back into the conditioned space. As will be shown in FIG. 6, air path 82 is substantially C-shaped, with air being discharged in the opposite direction from which the air entered.

FIG. 5 further shows electronic control apparatus 86, which regulates the operation of transport temperature control unit 12. In FIG. 5, electronic control apparatus 86 is shown protected by a casing 84, which can be opened to service control apparatus 86 when needed. Electrical connectors 88 provide delivery of power from the motor of truck 10 to the electronic control apparatus 86, which in turn provides electrical power to other components in transport temperature control unit 12. FIG. 5 further shows connective tubing 72 by which coolant circulates from the engine of truck 10 to transport temperature control unit 12. As discussed above, the coolant can be used to cool components in truck 10, such as the supplier of electric power. Coolant tubing 72 typically is flexible, and typically extends over, and is unattached to, rear side 87 of casing 84. As will be shown in FIG. 9, making tubing 72 flexible and unattached to rear side 87 of the casing 84 allows tubing 72 to bend at pivot point 74, which is useful in a non-fixed mount of transport temperature control unit 12. Electric wires or cabling coupled to electrical connectors 88 likewise are flexible and can be arranged to accommodate the non-fixed mount shown in FIG. 9.

As has been discussed above, the components requiring power employ electric power, and receive this electric power from a source outside the transport temperature control unit 12. Compressor 70, condenser fans 40a–c and evaporator blowers 80a–d do not receive mechanical energy from a mover such as a diesel engine housed within unit 12. Nor do compressor 70, condenser fans 40a–c and evaporator blowers 80a–d receive electrical power from an electrical source such as a generator housed within unit 12. Rather, the electrical power is supplied by a source external to transport temperature control unit 12, such as from an alternator in the engine compartment of truck 10, or from another external power source.

The absence of a mover from transport temperature control unit 12 is advantageous in many respects. Movers such as engines take up considerable space. Not only does the mover itself consume space, the apparatus connecting the mover to the equipment consumes space as well. Such space-wasting apparatus may include wheels, belts and pulleys, which are not needed in transport temperature control unit 12. Elimination of belts and pulleys not only saves space, it allows efficient orientation of components. Condenser fans 40a–c, for example, are oriented horizontally, and driving the fans and generally cannot be efficiently driven by horizontal drive belts. Electrical operation of unit 12 and the absence of a mover and associated apparatus have the further benefits of reduced noise and vibration.

Figure 6:
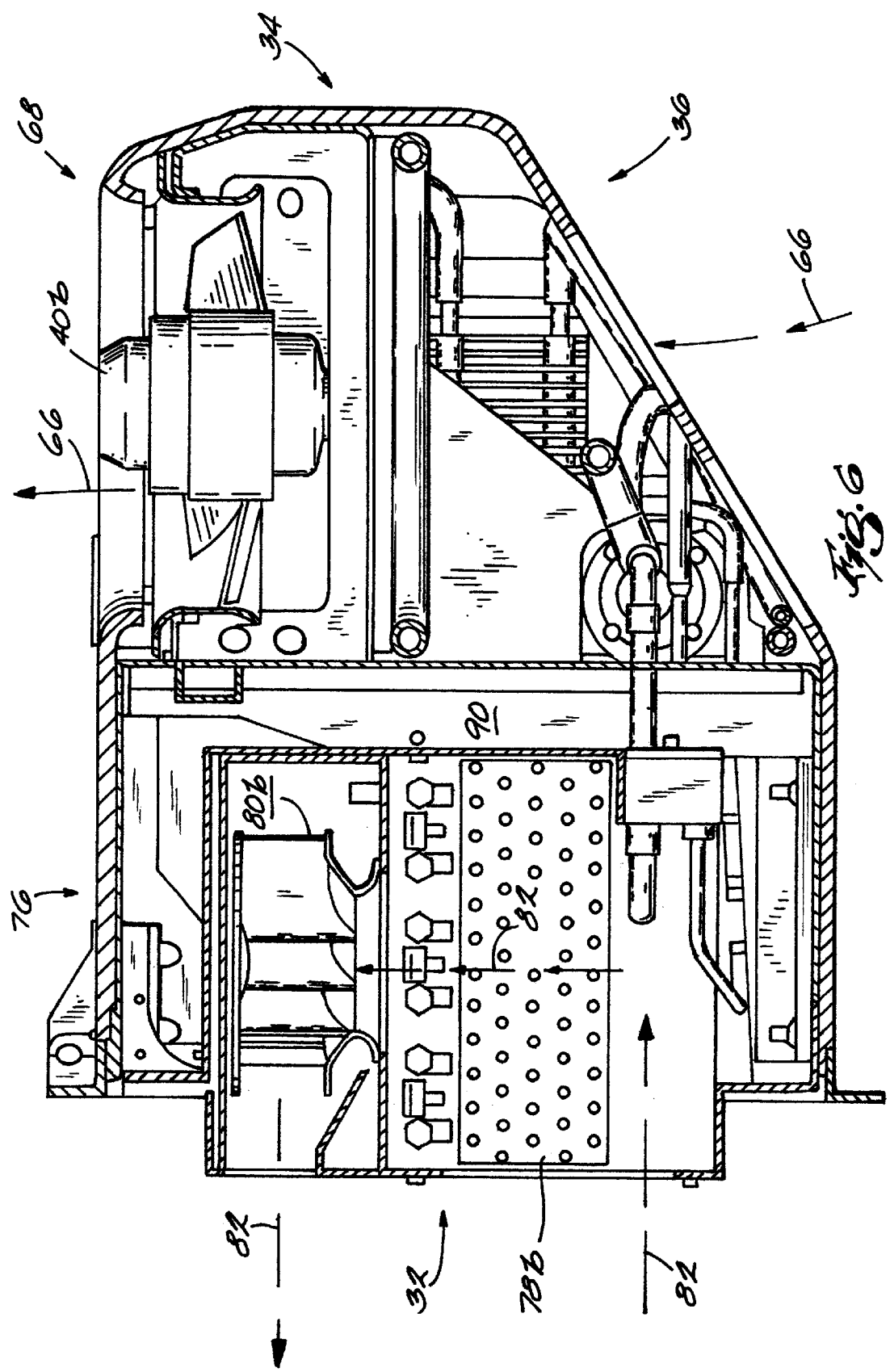
FIG. 6 is a cutaway view of a transport temperature control unit taken along 6—6 in FIG. 3.

FIG. 6 provides a cutaway view of transport temperature control unit 12 along reference 6—6 shown in FIG. 3. FIG. 6 shows typical condenser fan 40b and typical evaporator blower 80b. As shown by FIG. 6, condenser assembly 68 abuts evaporator assembly 76 with assemblies 68, 76 separated by an insulating wall 90, i.e., condenser assembly 68 and evaporator assembly 76 are located back-to-back. FIG. 6 further shows substantially C-shaped air path 82 through evaporator assembly 76, in which air is drawn from the conditioned space through evaporator coils 78b and is discharged back into the conditioned space.

Evaporator coils 78a, 78b in FIG. 5 could be flow connected to operate as a single evaporator coil, and could be controlled as a single evaporator coil. Alternatively, evaporator coils 78a, 78b could be controlled as independent evaporator coils. Independently controlled evaporator coils could be used to allow transport temperature control unit 12 to discharge air into the conditioned space at two different temperatures. If it is desirable to use transport temperature control unit 12 to discharge air into the conditioned space at two different temperatures, it is advantageous to flow connect evaporator coils 78a, 78b in parallel.

Figure 7:
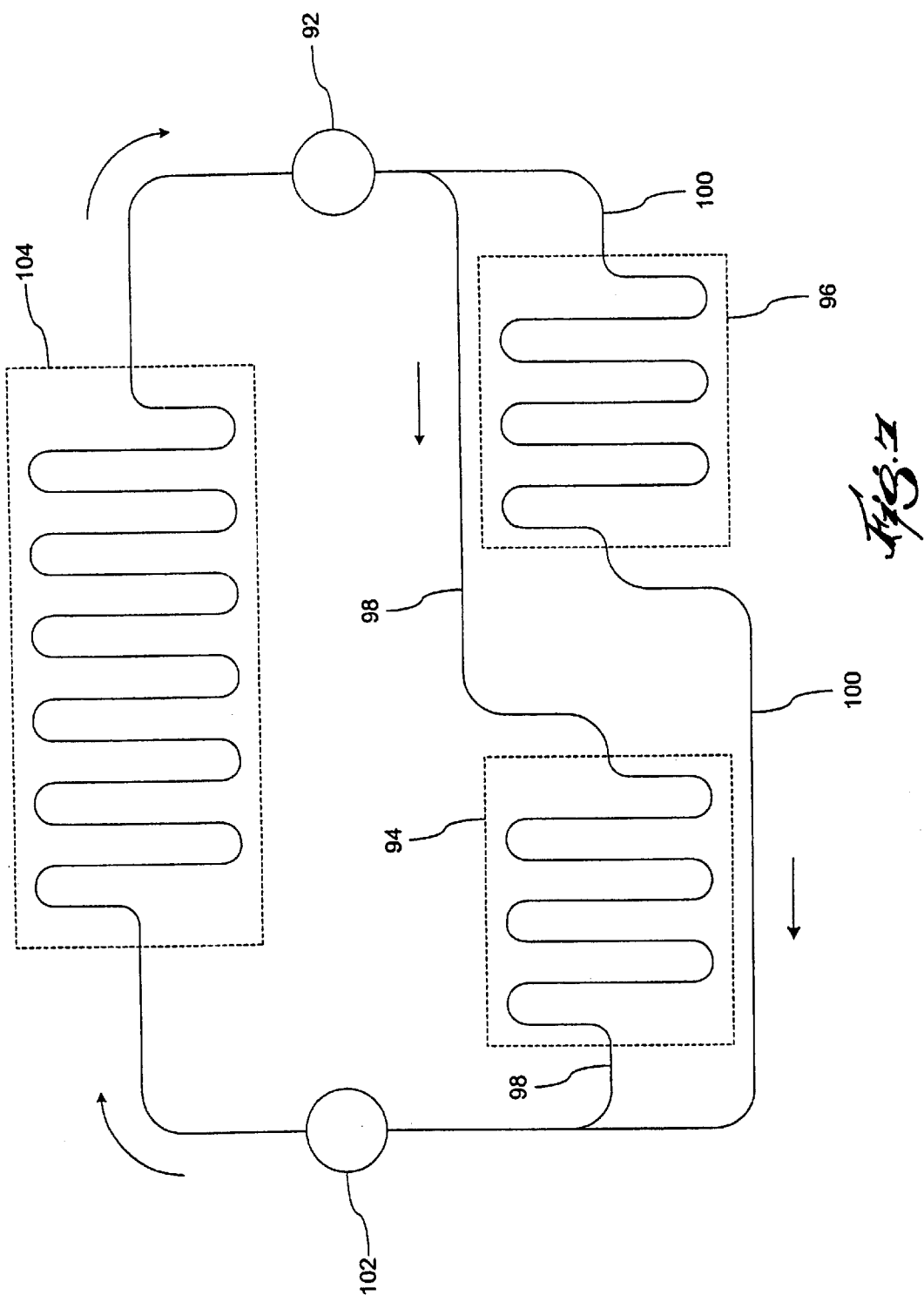
FIG. 7 is a schematic of a multi-evaporator refrigeration system with evaporators in parallel.

FIG. 7 is a schematic diagram illustrating parallel flow connection of independently-controlled evaporator coils 94 and 96 within a temperature control system. FIG. 6 shows the paths of the refrigerant through the temperature control system. Each individual evaporator coil 94 and 96 absorbs heat into the refrigerant. Refrigerant from both evaporator coils 94 and 96 flow combine and together through a compressor 102, which compresses the refrigerant and increases the refrigerant's heat. Heat is discharged from the refrigerant in the condenser 104. Thereafter the refrigerant flows through an expansion valve 92, which decompresses the refrigerant causing it to cool. The refrigerant is then dispensed to separate flow paths 98 and 100 to evaporators 94 and 96 respectively.

Figure 8:
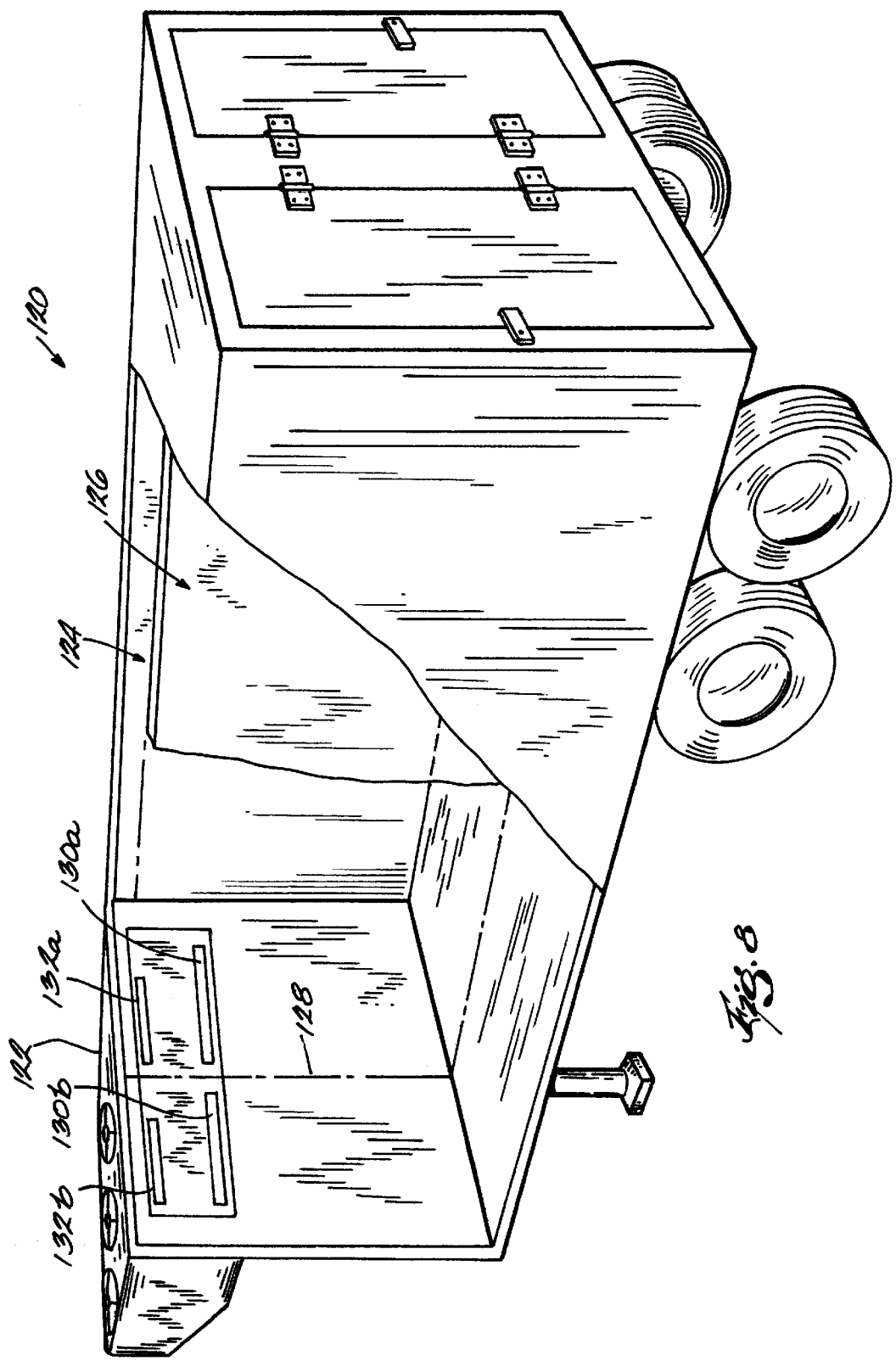
FIG. 8 is a cutaway view of the interior of a trailer illustrating an embodiment of the invention.

FIG. 8 is a cutaway drawing illustrating an application in which having independently-controlled evaporator coils is advantageous. Trailer 120 is divided into two compartments 124 and 126. Each compartment 124, 126 represents a separate conditioned space maintained at a different temperature. For example, one compartment 124 may contain frozen beef at a temperature of 5° F. (−15° C.) while the other compartment 126 may contain produce at a temperature of 35° F. (1.7° C.). Mounted on the front of trailer 120 is a transport temperature control unit 122, which is like transport temperature control unit 12 except that unit 122 includes independently-controlled evaporator coils. As FIG. 8 shows, transport temperature control unit 122 extends across nearly the full width of trailer 120. Transport temperature control unit 122 includes independent air intakes 130a and 130b and independent air outlets 132a and 132b to move air past the independently-controlled evaporator coils. Although trailer 120 shown in FIG. 8 has been divided along a lengthways plane 128 into compartments, a trailer may be compartmentalized in other ways as well, with a duct system conveying air between one of the compartments and transport temperature control unit 122 if necessary.

The capability of having independently-controlled evaporator coils is a consequence of the compact arrangement of transport temperature control unit 122. In particular, the span of the evaporator coils across most of the width of unit 122 allows for independently-controlled evaporator coils to serve two compartments 124 and 126. This span of evaporator coils is in turn made possible by the compact design of the refrigeration and cooling system 60 and electronic control apparatus 86, which are mounted along the sides of the back-to-back condenser assembly 68 and evaporator assembly 76, as shown in FIGS. 4 and 5. As noted above, the positioning of the evaporator assembly 76 and the air discharge near the top of the container provide for good air circulation around the load, and permit increased loading of cargo in the conditioned space.

Figure 9:
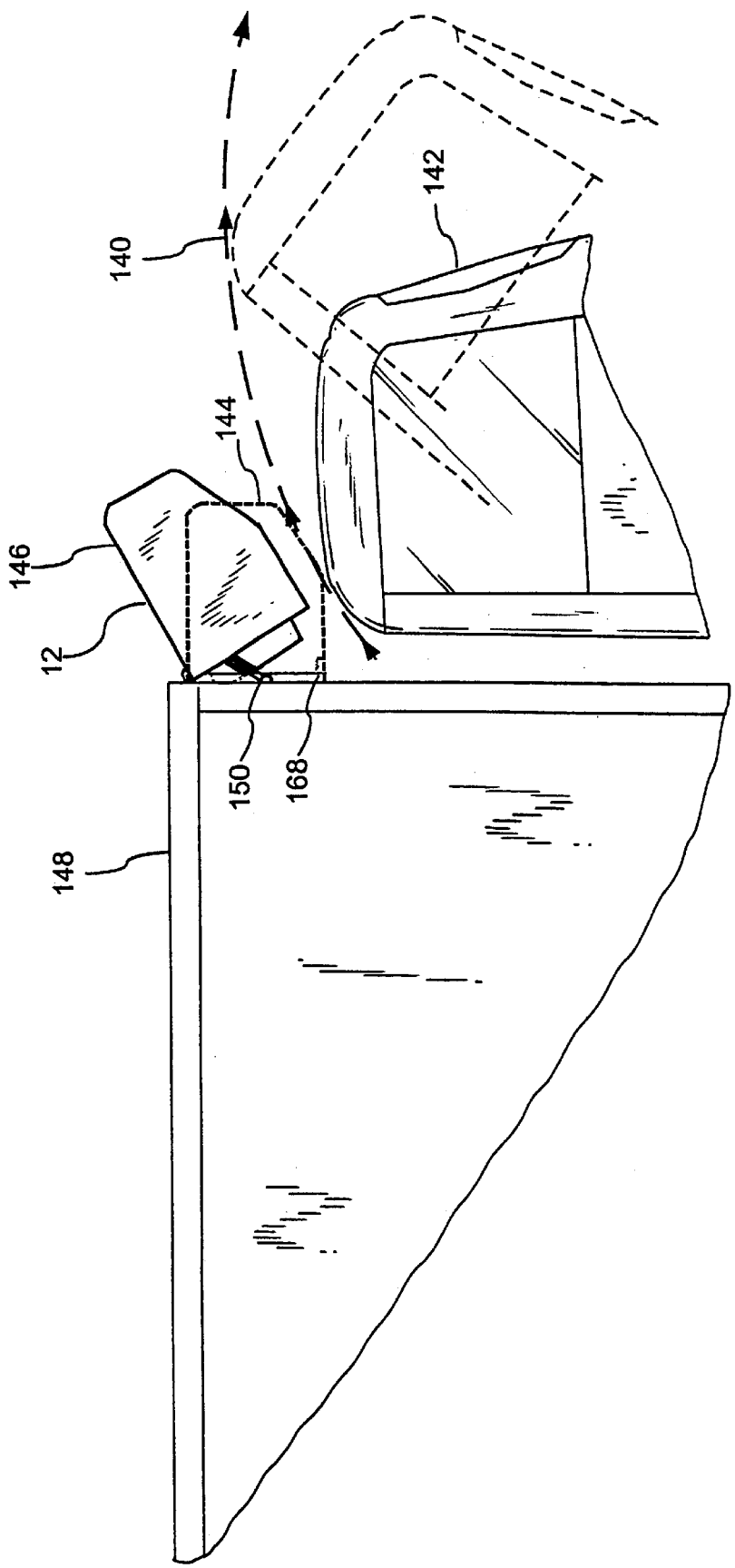
FIG. 9 is a side view of a tilt cab truck.

FIG. 9 depicts an additional aspect of the invention. FIG. 9 is similar to FIG. 1 except cab 142 has a large swing radius 140. Transport temperature control unit 12 as shown in FIG. 1 can be fixedly mounted to cargo container 20 because unit 12 does not impinge upon swing radius 18, and cab 14 can be swung forward 16 without contacting unit 12. Unit 12 may be fixedly mounted using standard mounting apparatus, such as mounting bolts. Large swing radius 140 as shown in FIG. 9, however, shows that cab 142 cannot be swung forward because it would contact normal position profile 144 of transport temperature control unit 12 if unit 12 were to be fixedly mounted. Transport temperature control unit 12 as shown in FIG. 9 is not fixedly mounted to cargo container 148, but can be swung upward to a raised position 146 above swing radius 140, allowing cab 132 to be swung forward. A support such as a fluid (e.g., hydraulic or pneumatic) cylinder 150 holds unit 12 in raised position 146.

FIG. 10 illustrates the apparatus by which transport temperature control unit 12 may be non-fixedly mounted. A frame 168 is fixedly mounted to cargo container 148 with standard mounting apparatus, such as mounting bolts 166a and 166b. Unit 12 is mounted to frame 168 via hinge mounts 47a and 47b, which act as pivots and are oriented to allow unit 12 to swing upward to a raised position. Cylinder 150 is coupled to frame 168 and to a divider 160 separating refrigeration and cooling system 60 from evaporator coils 78a. Cylinder 150 is coupled to trailer 148 via frame 168, or cylinder 150 may be coupled directly to trailer 148. When unit 12 is in its normal position 144, cylinder 150 is hidden by cover 30. Cylinder 150 extends to hold unit 12 in a raised position, and also contracts to return unit 12 to its normal position 144. To prevent unit 12 from swinging during ordinary operation, a securing mechanism, such as a latch 162 coupled to frame 168 and a pawl 164 coupled to unit 12, hold unit 12 in place. When engaged, latch 162 and pawl 164 secure unit 12 to trailer 148 and seal unit 12 against trailer 148. Latch 162 may be engaged with pawl 164 in several ways, such as by spring-loading latch 162 to engage pawl 164 or physically locking latch 162 in a position where latch 162 engages pawl 164. Latch 162 may be disengaged from pawl 164 to allow unit 12 to be lifted to its raised position 146. The securing mechanism may be configured to engage and disengage automatically.

A number of embodiments of the invention have been described. These and other embodiments are within the scope of the following claims.

What is claimed is:

1. A transport temperature control unit adapted to maintain a conditioned space at a desired temperature, the transport temperature control unit comprising:
    an electrically-powered condenser assembly; and
    an electrically-powered evaporator assembly flow connected to the condenser assembly;
        wherein the evaporator assembly adapted to be located outside the conditioned space, and
    wherein the electrical power is supplied from a source external to the transport temperature control unit.

2. The unit of claim 1, wherein the condenser assembly and evaporator assembly are adjoined back-to-back.

3. The unit of claim 1 further comprising an electrically-powered compressor adjoined to the condenser assembly and the evaporator assembly.

4. The unit of claim 3, wherein the compressor is a hermetic scroll compressor.

5. The unit of claim 1, wherein the condenser assembly includes a plurality of electrically-powered fans.

6. The unit of claim 5, wherein each fan rotates in the horizontal plane.

7. The unit of claim 5, wherein each fan is independently controllable.

8. The unit of claim 1, wherein the evaporator assembly includes a plurality of electrically-powered impellers.

9. The unit of claim 8, wherein each impeller rotates in the horizontal plane.

10. The unit of claim 8, wherein each impeller is independently controllable.

11. The unit of claim 1, wherein the condenser assembly draws air from beneath the unit.

12. A temperature-controlled transport system, comprising:
    an enclosure for holding cargo that includes a floor, a ceiling, and a front end generally perpendicular to the floor and ceiling, the enclosure defining a conditioned space; and
    a transport temperature control unit for maintaining the conditioned space at a desired temperature, the transport temperature control unit mounted to the front end of the enclosure, the transport temperature control unit comprising:
        an electrically-powered condenser assembly; and
        an electrically-powered evaporator assembly flow connected to the condenser assembly;
            wherein the evaporator assembly is located outside the conditioned space, and
        wherein the electrical power is supplied from a source external to the transport temperature control unit.

13. The system of claim 12 further comprising a tilt-cab coupled to the enclosure, wherein the tilt-cab defines a swing radius.

14. The system of claim 13, wherein the transport temperature control unit does not impinge upon the swing radius.

15. The system of claim 12, wherein the transport temperature control unit is fixedly 11 mounted.

16. The system of claim 12, wherein the transport temperature control unit has a top, a front side and a rear side, the system further comprising:
 a pivot member positioned near the juncture of the top side and the rear side of the transport temperature control unit, wherein the pivot member couples the transport temperature control unit to the enclosure and wherein the pivot member is so oriented to permit the front side of the transport temperature control unit to swing upward.

17. The system of claim 16, further comprising a frame mounted to the front end of the enclosure, wherein the frame couples the transport temperature control unit to the enclosure.

18. The system of claim 16 further comprising a fluid cylinder coupled to the transport temperature control unit and to the enclosure, the fluid cylinder acting between the transport temperature control unit and the enclosure.

19. The system of claim 16, wherein the transport temperature control unit has a bottom, the system further comprising further comprising a securing mechanism configured to secure the bottom and the rear side of the transport temperature control unit to the enclosure, and further configured to disengage to permit the front side of the transport temperature control unit to swing upward.

20. The system of claim 12 further comprising a supplier of electric power coupled to the transport temperature control unit.

21. The system of claim 12, wherein the transport temperature control unit discharges air substantially along the width of the front end.

22. The system of claim 12, wherein the transport temperature control unit discharges air substantially near the ceiling of the enclosure.

23. The system of claim 12, wherein the transport temperature control unit includes at least two evaporator sub-assemblies.

24. The system of claim 23, wherein each evaporator sub-assembly is configured to discharge air at a different temperature.

25. The unit of claim 23, wherein the evaporator sub-assemblies are arranged side-by-side.

26. The unit of claim 23, wherein the evaporator sub-assemblies are flow connected with each other in parallel.

* * * * *